(12) United States Patent
Izawa

(10) Patent No.: US 10,847,282 B2
(45) Date of Patent: Nov. 24, 2020

(54) WIRE HARNESS

(71) Applicant: SUMITOMO WIRING SYSTEMS, LTD., Yokkaichi (JP)

(72) Inventor: Katsutoshi Izawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/487,148

(22) PCT Filed: Feb. 15, 2018

(86) PCT No.: PCT/JP2018/005233
§ 371 (c)(1),
(2) Date: Aug. 20, 2019

(87) PCT Pub. No.: WO2018/155299
PCT Pub. Date: Aug. 30, 2018

(65) Prior Publication Data
US 2020/0058418 A1    Feb. 20, 2020

(30) Foreign Application Priority Data

Feb. 22, 2017   (JP) ................. 2017-030998

(51) Int. Cl.
*H01B 7/20*   (2006.01)
*H02G 3/04*   (2006.01)
(Continued)

(52) U.S. Cl.
CPC .............. *H01B 7/20* (2013.01); *H01R 9/0512* (2013.01); *H02G 3/0418* (2013.01); *H01R 13/6585* (2013.01)

(58) Field of Classification Search
CPC .. H01R 9/0518; H01R 9/0512; H01R 9/0521; H01R 9/0524; H01R 13/6585; H01R 13/6588; H01R 13/6592; H01R 13/6597
See application file for complete search history.

(56) References Cited

U.S. PATENT DOCUMENTS 4,489,217 A  * 12/1984  Klopfer .................. H01R 4/723
                                                    174/359
5,102,351 A  *  4/1992  Meshel .................. H01R 9/032
                                                    439/585
(Continued)

FOREIGN PATENT DOCUMENTS

JP    S61-076005 A   4/1986
JP    H2-103883 A    4/1990
(Continued)

OTHER PUBLICATIONS

Mar. 13, 2018 International Search Report issued in International Patent Application No. PCT/JP2018/005233.

*Primary Examiner* — Nguyen Tran
*Assistant Examiner* — Paul D Baillargeon
(74) *Attorney, Agent, or Firm* — Oliff PLC

(57) ABSTRACT

A wire harness includes a plurality of electric wires, a plurality of flexible and conductive tubular individual shields individually covering and electromagnetically shielding the plurality of electric wires, a flexible and conductive tubular collective shield collectively covering and electromagnetically shielding at least portions of the plurality of electric wires that are not covered by the individual shields, and a connector configured to electrically connect the collective shield and the plurality of individual shields to each other in a state in which the collective shield and the plurality of individual shields overlap each other.

5 Claims, 6 Drawing Sheets

(51) Int. Cl.
*H01R 9/05* (2006.01)
*H01R 13/6585* (2011.01)

(56) References Cited

U.S. PATENT DOCUMENTS

| | | | |
|---|---|---|---|
| 7,255,602 B1* | 8/2007 | Driessen | H01R 4/01 439/607.47 |
| 9,017,110 B2* | 4/2015 | Guillanton | H02G 3/0666 439/730 |
| 2010/0112841 A1 | 5/2010 | Yong | |
| 2010/0178805 A1 | 7/2010 | Yong et al. | |
| 2016/0104977 A1 | 4/2016 | Yanagihara et al. | |

FOREIGN PATENT DOCUMENTS

| JP | 2010-165512 A | 7/2010 |
|---|---|---|
| JP | 2011-173456 A | 9/2011 |

* cited by examiner

WIRE HARNESS

This application is the U.S. National Phase of PCT/JP2018/005233 filed Feb. 15, 2018, which claims priority to JP 2017-030998 filed Feb. 22, 2017, the entire disclosures of which are incorporated herein by reference.

The present disclosure relates to a wire harness.

BACKGROUND

Conventionally, a collective shield connector for collectively shielding a plurality of electric wires, and a core shield connector in which a plurality of electric wires are individually shielded in a wire harness are known (e.g., see Patent Documents 1 and 2).

The collective shield connector disclosed in Patent Document 1 includes a collective connector housing from which a plurality of electric wires extend rearward, and a collective shield shell attached to the rear portion of the collective connector housing. The collective shield shell is provided with a collective insertion portion that is open in the front-rear direction and into which a plurality of electric wires are collectively inserted, and by collectively covering the plurality of electric wires inserted into this collective insertion portion with a flexible collective shield member, the plurality of electric wires are collectively shielded.

A core shield connector disclosed in Patent Document 2 includes a connector housing for cores from which a plurality of electric wires extend rearward, and a core shield shell attached to the rear portion of the connector housing for cores. The core shield shell is provided with a plurality of core insertion portions into which the plurality of electric wires are individually inserted in the front-rear direction, and by covering the plurality of electric wires inserted into the core insertion portions with flexible individual shield members, the electric wires are individually shielded.

CITATION LIST

Patent Documents

Patent Document 1: JP 2010-113910A
Patent Document 2: JP 2010-165512A.

SUMMARY

Incidentally, if one of the devices connected to a wire harness as described above is a core shield connector, and the other device is a collective shield connector, the wire harness described above includes both a flexible collective shield member for collectively shielding a plurality of electric wires and flexible individual shield members for individually shielding the plurality of electric wires. In this case, there is a risk that shield performance will decrease in a state in which shield members are not electrically connected to each other.

An exemplary aspect of the disclosure is directed to resolve the above-described issues, and an object thereof is to provide a wire harness by which shield performance is kept from decreasing when a collective shield member and individual shield members are used.

A wire harness by which the above-described issues are resolved includes a wire harness having a plurality of electric wires, a plurality of flexible and conductive tubular individual shields individually covering and electromagnetically shielding the plurality of electric wires the individual shields each being tubular and braided from a plurality of metal wires. A flexible and conductive tubular collective shield collectively covering and electromagnetically-shielding at least portions of the plurality of electric wires that are not covered by the individual shields. A connector configured to electrically connect the collective shield and the plurality of individual shields to each other in a state in which the collective shield and the plurality of individual shields overlap each other, wherein the collective shield is in direct contact with the individual shields.

According to this configuration, the collective shield member and the plurality of individual shield members are electrically connected to each other by the connection portion in a state in which the collective shield member and the plurality of individual shield members overlap each other, and thus electrical connection is ensured and shield performance can be kept from decreasing.

It is preferable that, in the above-described wire harness, the collective shield member is electrically connected by the connection portion in a state in which the collective shield member and the plurality of individual shield members overlap each other due to the plurality of individual shield members being fitted into the collective shield member.

According to this configuration, the collective shield member ensures electrical connection in a state in which the individual shield members and the collective shield member reliably overlap each other due to the plurality of individual shield members being fitted into the collective shield member, and can keep shield performance from decreasing.

It is preferable that, in the above-described wire harness, the connection portion includes a tubular inner connection member provided inward of the plurality of individual shield members and an outer connection member fitted around the collective shield member, and the collective shield member and the plurality of individual shield members are electrically connected to each other while being held between the inner connection member and the outer connection member.

According to this configuration, the collective shield member and the plurality of individual shield members are electrically connected to each other due to being held between the inner connection member and the outer connection member that constitute the connection portion, and thus the collective shield member and the plurality of individual shield members can be reliably electrically connected to each other.

It is preferable that the above-described wire harness further includes a plurality of coating portions individually covering the plurality of individual shield members, and in a state in which portions of the plurality of individual shield members that are exposed from the coating portions are folded back to cover the outer side of the coating portions, the inner connection member is provided between the portions of the individual shield members covering the outer side of the coating portions and the coating portions, and the collective shield member and the plurality of individual shield members are electrically connected to each other while being held between the inner connection member and the outer connection member.

According to this configuration, the wire harness has coating portions individually covering the plurality of individual shield members, and in a state in which portions of the individual shield members exposed from the coating portions are folded to cover the outer side of the coating portions, the inner connection member is provided at the portions between the coating portions and the individual shield members. Also, it is possible to reliably electrically connect the collective shield member and the plurality of individual shield members to each other between the inner connection member and the outer connection member.

It is preferable that the above-described wire harness further includes a plurality of coating portions individually covering the plurality of individual shield members, and the inner connection member is one of identical inner connection members that are individually provided between the portions of the plurality of individual shield members that are exposed from the coating portions and the plurality of electric wires, and the collective shield member and the plurality of individual shield members are electrically connected to each other while being held between the inner connection member and the outer connection member.

According to this configuration, the wire harness has coating portions individually covering the plurality of individual shield members, and the inner connection members are individually provided between the plurality of electric wires and the portions of the plurality of individual shield members exposed from the coating portions. Also, it is possible to reliably electrically connect the collective shield member and the plurality of individual shield members to each other between the inner connection member and the outer connection member.

Advantages

A wire harness in accordance with preferred embodiments makes it possible to keep shield performance from decreasing when a collective shield member and an individual shield member are used.

DESCRIPTION OF EMBODIMENTS

First Embodiment

Figure 1:
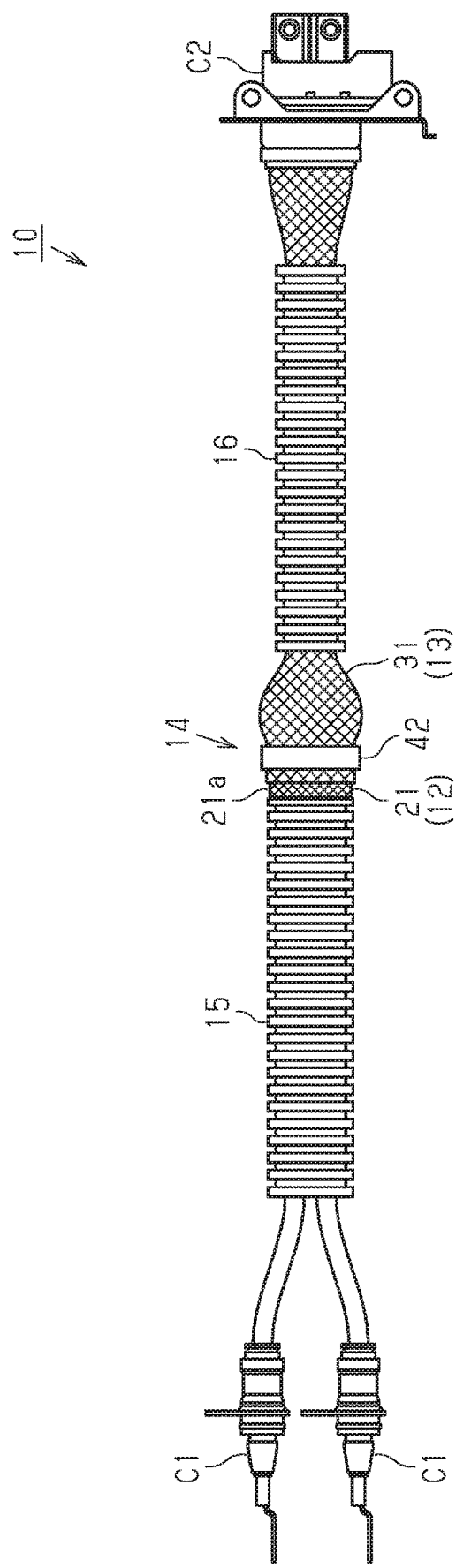
FIG. 1 is a schematic configuration diagram of a wire harness according to a first embodiment.

Hereinafter, a wire harness according to a first embodiment will be described with reference to the drawings. Note that a portion of a configuration may be exaggerated or simplified for convenience of a description in the drawings. Also, a size ratio of portions may be different from the actual size ratio.

As shown in FIG. 1, a wire harness 10 is for, in a vehicle such as a hybrid car or an electric automobile, connecting a high-voltage battery installed in the vehicle and an inverter that is also installed in the vehicle, for example. An inverter is connected to a high-voltage battery that is capable of supplying a voltage of a magnitude of hundreds of volts, and is for converting direct-current power supplied from the high-voltage battery to alternating-current power, and supplying this power to a motor for driving a wheel serving as a motive power source for traveling of a vehicle.

Figure 2:
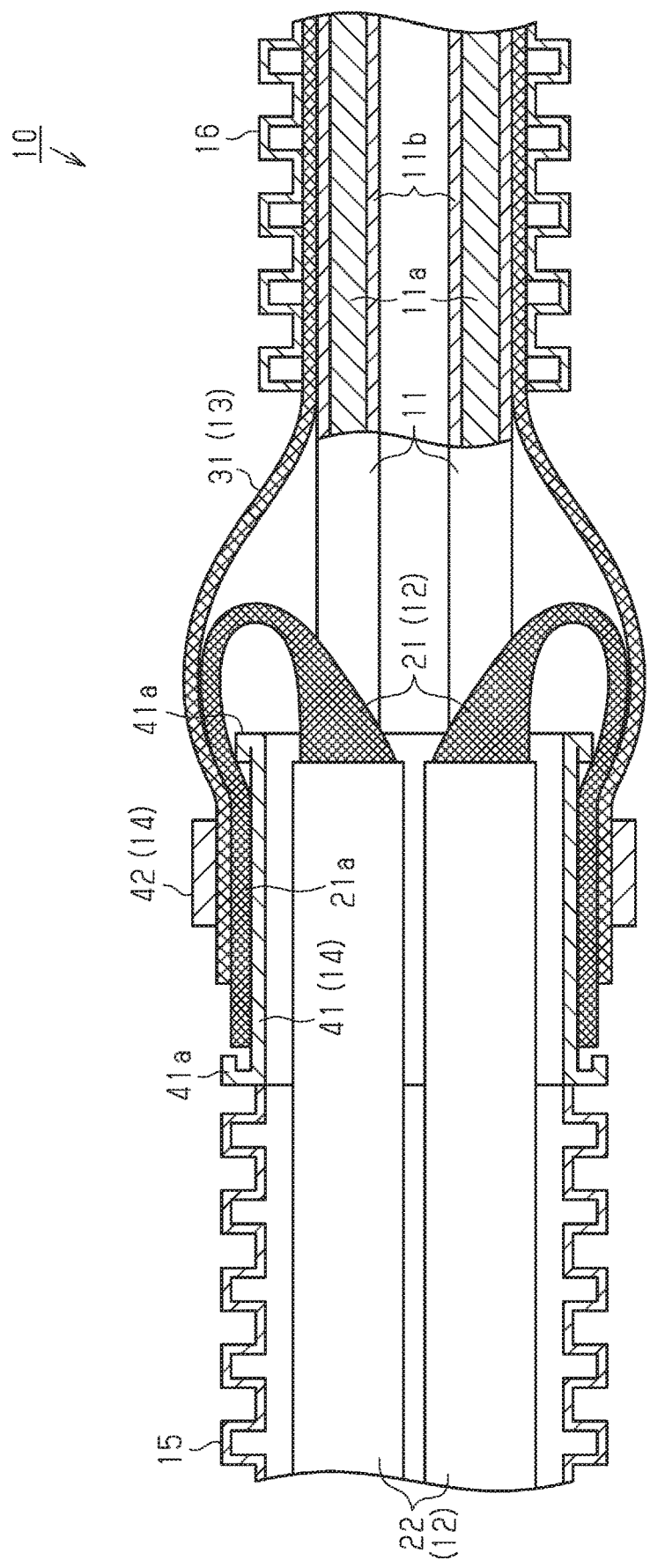
FIG. 2 is a cross-sectional view of the wire harness according to the first embodiment.

As shown in FIGS. 1 and 2, the wire harness 10 according to the present embodiment includes a plurality of electric wires 11, individual shield portions 12, a collective shield portion 13, a connection portion 14 for connecting the individual shield portions 12 and the collective shield portion 13, an external member 15 collectively covering the outer side of the electric wires 11 and the individual shield portions 12, and an external member 16 covering the outer side of the electric wires 11 and the collective shield portion 13.

As shown in FIG. 2, the plurality of electric wires 11 each include a core wire 11a and an insulating coating 11b covering the core wire 11a. The electric wires 11 are non-shielded electric wires that do not have a shield structure and are capable of handling high voltage and large current.

As shown in FIG. 1, one end of each of the plurality of electric wires 11 is provided with an individual connector portion C1. The other end of each of the plurality of electric wires 11 is provided with a collective connector portion C2 that groups the plurality of electric wires 11.

The individual shield portions 12 include individual shield members 21 individually covering the electric wires 11 from one end side of each of the electric wires 11 provided with an individual connector portion C1 to a midpoint toward the other end side, and coating portions 22 that cover the outer side of the individual shield members 21.

The individual shield members 21 are tubular braided members obtained by braiding a plurality of metal wires, for example, and have conductivity and flexibility.

The coating portion 22 is an insulating tubular member, for example, and covers an individual shield member 21 so as to make the individual shield member 21 be in tight contact with an electric wire 11.

Also, the individual shield portion 12 according to the present embodiment includes a folded portion 21a obtained by folding back the individual shield member 21 exposed from the coating portion 22 to cover the outer side of the coating portion 22. The folded portion 21a of each of the individual shield members 21 is located apart from the folded portion 21a of another individual shield member 21 in the circumferential direction of the wire harness 10.

The collective shield portion 13 includes a collective shield member 31 collectively covering the electric wires 11 from the other end side of each of the electric wires 11 provided with the collective connector portion C2 to a midpoint toward the one end side.

The collective shield member 31 is a tubular braided member obtained by braiding a plurality of metal wires, for example, and has conductivity and flexibility. The collective shield member 31 has a larger diameter than the above-described individual shield member 21.

The collective shield member 31 covers the folded portions 21a of the individual shield members 21 so as to be fitted around the folded portions 21a, and the folded portions 21a of the individual shield members 21 overlap a portion of the collective shield member 31 in the circumferential direction. Also, the collective shield member 31 and the individual shield members 21 (the folded portions 21a) are electrically connected to each other by the connection portion 14 in a state in which the collective shield member 31 and the individual shield members 21 overlap each other.

The connection portion 14 includes an inner connection member 41 provided inward of the plurality of individual shield members 21 and an outer connection member 42 fitted around the collective shield member 31.

The inner connection member 41 is constituted by a tubular member made of resin or metal, for example. The inner connection member 41 is provided between the folded portions 21a of the individual shield members 21 and the coating portions 22. At this time, two electric wires 11, the individual shield members 21 covering the outer side of the electric wires 11, and the coating portions 22 covering the outer side of the individual shield members 21 are inserted (fitted) into one inner connection member 41.

Both ends of the inner connection member 41 are provided with flange portions 41a extending outward in the radial direction thereof. This keeps a cut surface resulting when a tubular member is molded from coming into contact with and cutting the electric wires 11 and the shield members 21 and 31, for example. Also, as a result of providing the flange portions 41a extending outward in the radial direction, the effect of retaining the outer connection member 42 can be expected.

The outer connection member 42 is constituted by a crimping band made of resin or metal, for example. Note that the outer connection member 42 is not limited thereto, and may also be constituted by a crimping ring made of resin or metal, for example.

The outer connection member 42 is provided at a position corresponding to the inner connection member 41, that is, a position at which the folded portions 21a of the individual shield members 21 and the outer side of the collective shield member 31 fitted around the folded portions 21a are covered by the outer connection member 42. Also, as a result of the outer connection member 42 being crimped, the individual shield members 21 (the folded portions 21a) and the collective shield member 31 that are located between the outer connection member 42 and the inner connection member 41 are in contact with each other in the radial direction and are electrically connected to each other.

As shown in FIG. 1, the external members 15 and 16 are tubular corrugate tubes, for example, and have flexibility. Also, in this example, end portions of the external member 15 and the external member 16 are located apart from each other in a portion in which the connection portion 14 is located. A piece of insulating tape (not shown) is then half-wrapped to span the external member 15 and the external member 16, and thus it is possible to keep an electrical connection region between the collective shield member 31 and the individual shield members 21 that are located at the connection portion 14 from being exposed to the outside.

Next, functional effects of the present embodiment will be described,

In the wire harness 10 according to the present embodiment, the individual shield members 21 and the collective shield member 31 are electrically connected by the connection portion 14 in a state in which the individual shield members 21 and the collective shield member 31 overlap each other. Also, at least one of the individual shield members 21 and the collective shield member 31 is grounded, and thus an electromagnetic shield effect can be obtained.

Next, effects of the present embodiment will be described.

(1) Because the collective shield member 31 and the plurality of individual shield members 21 are electrically connected to each other by the connection portion 14 in a state in which the collective shield member 31 and the plurality of individual shield members 21 overlap each other, it is possible to ensure electrical connection and keep shield performance from decreasing.

(2) As a result of the plurality of individual shield members 21 being fitted into the collective shield member 31, it is possible to ensure electrical connection in a state in which the individual shield members 21 and the collective shield member 31 reliably overlap each other, and to keep shield performance from decreasing.

(3) Because the collective shield member 31 and the plurality of individual shield members 21 are electrically connected to each other due to the collective shield member 31 and the individual shield members 21 being held between the inner connection member 41 and the outer connection member 42 that constitute the connection portion 14, the collective shield member 31 and the plurality of individual shield members 21 can be reliably electrically connected to each other.

(4) The individual shield portions 12 include the coating portions 22 individually covering the plurality of individual shield members 21, and in a state in which the individual shield members 21 exposed from the coating portions 22 are folded back to cover the outer side of the coating portions 22, the inner connection member 41 is provided between the coating portions 22 and the individual shield members 21 in the folded portions 21a. Thus, the collective shield member 31 and the plurality of individual shield members 21 can be reliably electrically connected to each other between the inner connection member 41 and the outer connection member 42.

(5) Because the connection portion 14 is constituted by one inner connection member 41 and one outer connection member 42, the number of components can be kept from increasing.

(6) As a result of the inner connection member 41 of the connection portion 14 being constituted by a tubular member made of resin or metal, paths of the electric wires 11 can be restricted.

(7) Because the individual connector portion C1 and the collective connector portion C2 can be used in combination, an existing connector portion can be used, and there is no need to manufacture a new connector.

(8) As a result of providing both ends of the inner connection member 41 with the flange portions 41a, the effect of retaining the outer connection member 42 can be expected.

Second Embodiment

Hereinafter, a second embodiment of a wire harness will be described with reference to the drawings. Note that a portion of a configuration may be exaggerated or simplified in the drawings for convenience of description. Also, a size ratio of portions may be different from the actual size ratio. Also, in the present embodiment, configurations that are similar to those of the above-described first embodiment are given the same reference numerals, and some or all of the detailed descriptions thereof will be omitted.

Figure 3:
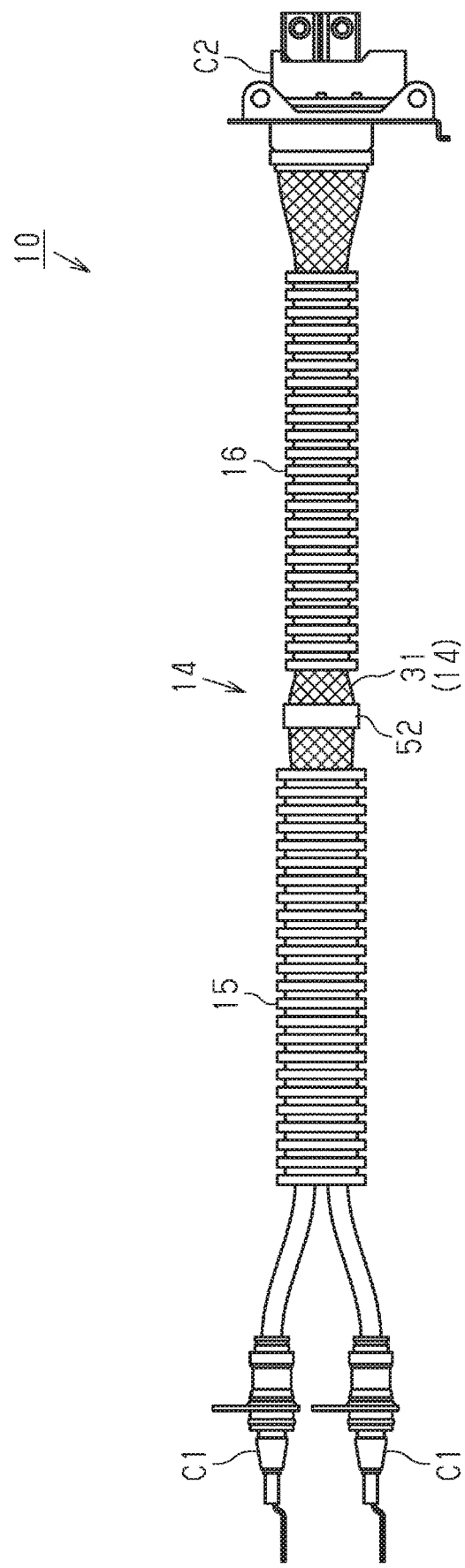
FIG. 3 is a schematic configuration diagram of a wire harness according to a second embodiment.
Figure 4:
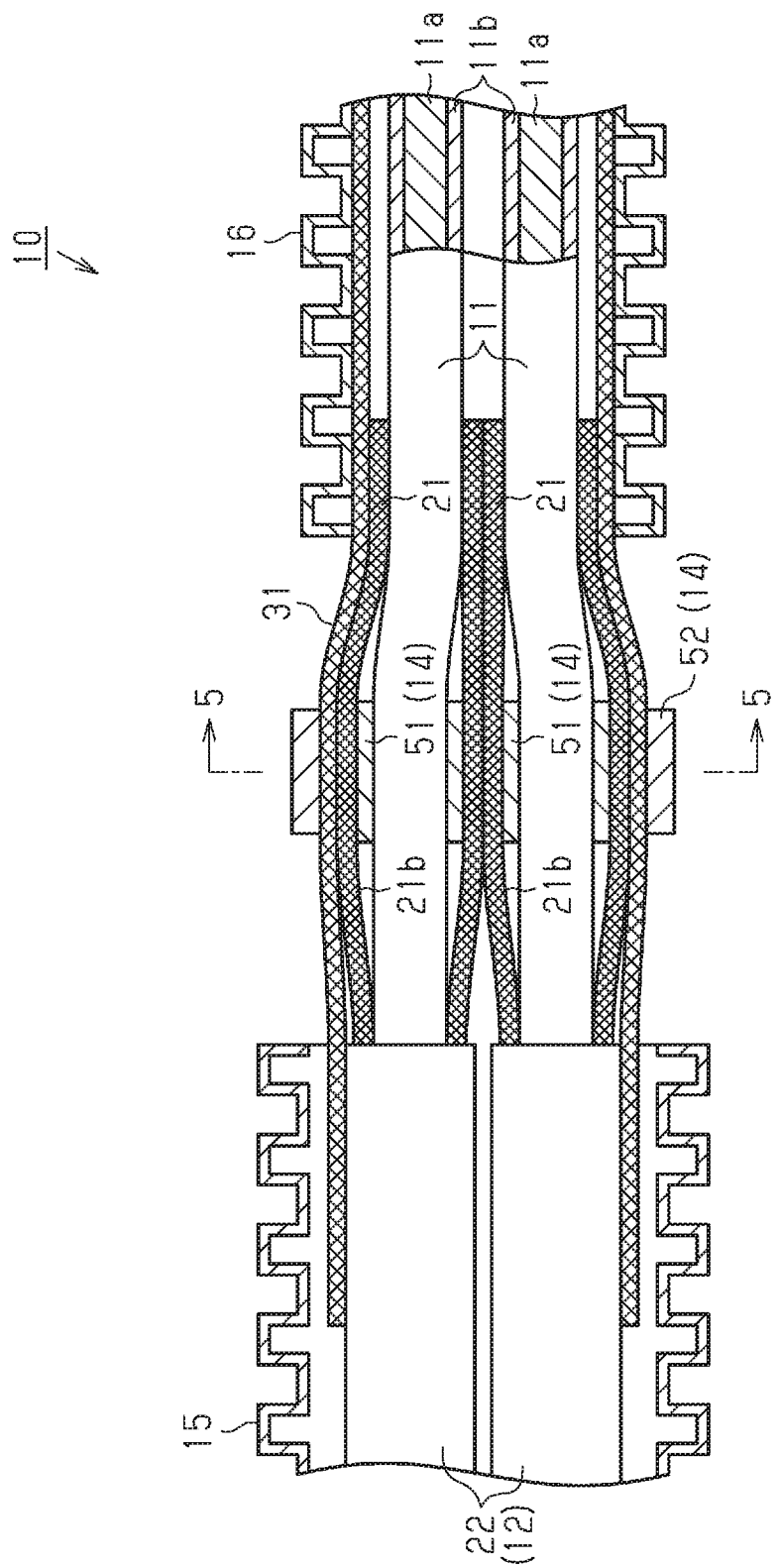
FIG. 4 is a cross-sectional view of the wire harness according to the second embodiment.

As shown in FIGS. 3 and 4, the individual shield members 21 of the wire harness 10 according to the present embodiment are drawn out from the coating portions 22 such that portions 21b exposed from the coating portions 22 have an approximately straight shape. The individual shield members 21 according to the present embodiment have a configuration in which leading ends of the portions 21b exposed from the coating portions 22 enter the external member 16.

Similarly to the first embodiment, the collective shield member 31 is constituted having a tubular shape whose diameter is larger than that of the individual shield members 21, and collectively covers the portions 21b of the individual shield members 21 and the electric wires 11 that are exposed from the coating portions 22 so as to be fitted around the portions 21b and the electric wires 11. The collective shield member 31 according to the present embodiment has a configuration in which the leading end of the collective shield member 31 enters the external member 15.

Figure 5:
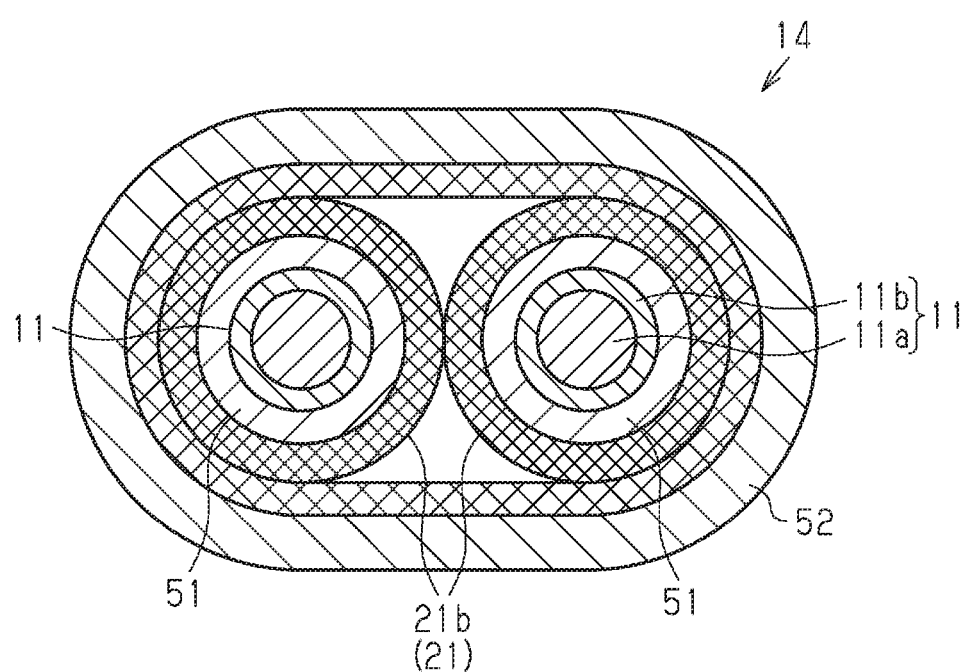
FIG. 5 is a cross-sectional view taken along 5-5 in FIG. 4.

As shown in FIGS. 4 and 5, an inner connection member 51 constituting the connection portion 14 is provided between the exposed portion 21b of each of the individual shield members 21 and an electric wire 11 (the insulating coating 11b). That is, with the wire harness 10 according to the present embodiment, unlike the inner connection member 41 in the first embodiment, the same number of inner connection members 51 as electric wires 11 are required. Similarly to the inner connection member 41 in the first embodiment, the inner connection member 51 is constituted by a tubular member made of resin or metal, for example. Note that the configuration of the inner connection member 51 is the configuration of the first embodiment minus the flange portions 41a provided on the inner connection member 41.

The outer connection member 52 constituting the connection portion 14 is provided at a position corresponding to the inner connection members 51, that is, a position at which the exposed portions 21b of the individual shield members 21 and the outer side of the collective shield member 31 fitted around the exposed portions 21b are covered by the outer connection member 52. Also, as a result of the outer connection member 52 being crimped, the individual shield member 21 (the portions 21b) and the collective shield member 31 that are located between the outer connection member 52 and the inner connection members 51 are in contact with each other in the radial direction thereof and are electrically connected to each other. At this time, the individual shield members 21 (the portions 21b) are also in direct contact with each other, and thus are electrically connected to each other.

Next, functional effects of the present embodiment will be described.

In the wire harness 10 according to the present embodiment, the individual shield members 21 and the collective shield member 31 are electrically connected to each other by the connection portion 14 in a state in which the individual shield members 21 and the collective shield member 31 overlap each other. Also, at least one of the individual shield members 21 and the collective shield member 31 is grounded, and thus an electromagnetic shield effect can be obtained.

The above-described wire harness 10 has the following effects, in addition to the effects (1) to (3) and (6) in the first embodiment.

(9) The inner connection members 51 are individually provided between the individual shield members 21 exposed from the coating portions 22 and the electric wires 11. Thus, the collective shield member 31 and the plurality of individual shield members 21 can be reliably electrically connected to each other between the inner connection members 51 and the outer connection member 52.

(10) The individual shield members 21 are configured to be in direct contact with each other, and thus contribute to an improvement in contact reliability.

(11) The individual shield members 21 each have a length by which they enter the external member 16 and the collective shield member 31 has a length by which it enters the external member 15, and thus the individual shield members 21 and the collective shield member 31 are easy to overlap each other, and the reliability of contact between the individual shield members 21 and the collective shield member 31 can be increased.

(12) Because the need to fold back the individual shield members 21 is eliminated, the need to loosen a braided member or form a slit in a braided member is eliminated, which can contribute to an improvement in workability.

Note that the above-described embodiments may be modified as follows.

Although the above-described embodiments have a configuration in which, as a result of half-wrapping a piece of insulating tape (not shown) to span the external member 15 and the external member 16, a region at which the individual shield members 21 and the collective shield member 31 are electrically connected to each other by the connection portion 14 is not exposed, the present invention is not limited thereto.

Figure 6:
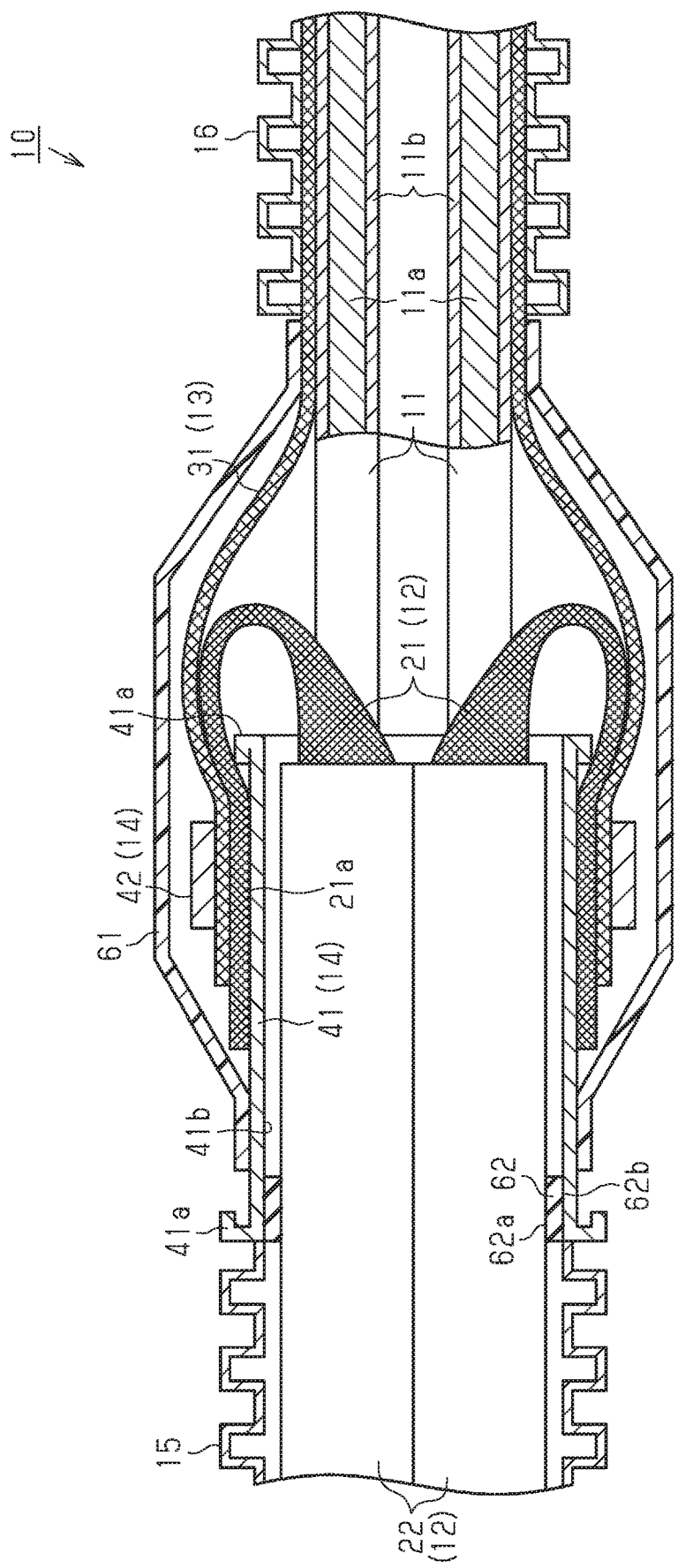
FIG. 6 is a cross-sectional view of a wire harness according to a variation.

As shown in FIG. 6, a configuration such as the shield members being covered by a coating cover 61 may be adopted. A resin grommet can be adopted as the coating cover 61, for example. The coating cover 61 is provided to cover the individual shield members 21 such as the folded portions 21a and the collective shield member 31 from an end portion of the external member 16 to the inner connection member 41. Also, an annular seal member 62 is provided inside the inner connection member 41. The seal member 62 closes off gaps located between the coating portions 22 and the inner connection member 41 in a state in which the coating portions 22 of the individual shield members 21 are in tight contact with each other. That is, the seal member 62 has a configuration such that an inner circumferential surface 62a thereof is in tight contact with the coating portion 22 of each individual shield member 21, and an outer circumferential surface 62b thereof is in tight contact with an inner circumferential surface 41b of the inner connection member 41. This makes it possible to keep water from entering from an opening portion of the inner connection member 41. Also, as described above, a region at which the individual shield members 21 and the collective shield member 31 are electrically connected to each other is covered by the coating cover 61, and thus water is also kept from entering this region.

Although the above-described embodiments have a configuration in which braided members are adopted as the flexible individual shield members 21 and the flexible collective shield member 31, the present invention is not limited thereto, and metal sheets (metal foils), metal fabrics, and the like may be adopted as shield members. At this time, different configurations may be adopted for the individual shield members 21 and the collective shield member 31, such as braided members being used as the individual shield members 21 and a metal sheet being used as the collective shield member 31.

Although corrugate tubes are adopted as the external members 15 and 16 in the above-described embodiments, the present invention is not limited thereto, and resin hard tubes or metal pipes may be adopted. A configuration may be adopted in which the external members 15 and 16 are omitted.

Although the present invention is applied to the wire harness 10 for connecting a high-voltage battery and an inverter in the above-described embodiments, in addition to this, the present invention may also be applied to a wire harness for connecting an inverter and a driving motor, for example.

The connector portion C1 and the connector portion C2 have different shapes in the above-described embodiments, but may have the same shape.

Although the collective shield member 31 has a configuration in which the leading end portion of the collective shield member 31 enters the external member 15 in the above-described second embodiment, a configuration may be adopted in which the collective shield member 31 does not enter the external member 15.

Although the individual shield members 21 according to the above-described second embodiment have a configuration in which leading end portions of the portions 21b exposed from the coating portions 22 enter the external member 16 in the second embodiment, a configuration may be adopted in which the individual shield members 21 do not enter the external member 16.

The above-described embodiments and variations may be used in combination as appropriate.

It will be apparent for a person skilled in the art that the present invention may be embodied in any other unique modes without departing from the technical idea thereof. For example, some of the components described in an embodiment (or one or more modes thereof) may be omitted, or may be combined. The scope of the present invention should be defined with reference to the attached claims, together with the entire scope of the equivalents of the claims that a patent is to be granted.

LIST OF REFERENCE NUMERALS

10 Wire harness
11 Electric wire
14 Connection portion
21 Individual shield member
22 Coating portion
31 Collective shield member
41 Inner connection member
42 Outer connection member
51 inner connection member
52 Outer connection member

The invention claimed is:

1. A wire harness comprising:
a plurality of electric wires;
a plurality of flexible and conductive tubular individual shields individually covering and electromagnetically shielding the plurality of electric wires, the individual shields each being a tubular braided member obtained by braiding a plurality of metal wires;
a flexible and conductive tubular collective shield collectively covering and electromagnetically shielding and being in direct contact with at least portions of the plurality of electric wires that are not covered by the individual shields; and
a connector configured to electrically connect the collective shield and the plurality of individual shields to each other in a state in which the collective shield and the plurality of individual shields overlap each other,
wherein the collective shield is in direct contact with the individual shields.

2. The wire harness according to claim 1,
wherein the collective shield is electrically connected by the connector in the state in which the collective shield and the plurality of individual shields overlap each other due to the plurality of individual shields being fitted into the collective shield.

3. The wire harness according to claim 2,
wherein the connector includes a tubular inner connector provided inward of the plurality of individual shields and an outer connector fitted around the collective shield, and
the collective shield and the plurality of individual shields are electrically connected to each other while being held between the inner connector and the outer connector.

4. The wire harness according to claim 3, further comprising
a plurality of coating sheaths individually covering a portion of the plurality of individual shields,
wherein, in a state in which portions of the plurality of individual shields that are exposed from the coating sheaths are folded back to cover the outer side of the coating sheaths, the inner connector is provided between the folded back portions of the individual shields and the coating sheaths, and
the collective shields and the plurality of individual shields are electrically connected to each other while being held between the inner connector and the outer connector.

5. The wire harness according to claim 3, further comprising
a plurality of coating sheaths individually covering a portion of the plurality of individual shields,
wherein the inner connector is one of identical inner connectors that are individually provided between portions of the plurality of individual shields that are exposed from the coating sheaths and the plurality of electric wires, and
the collective shield and the plurality of individual shields are electrically connected to each other while being held between the inner connector and the outer connector.

* * * * *